United States Patent
Grant et al.

[15] 3,675,406
[45] July 11, 1972

[54] BERRY PICKING MACHINE

[72] Inventors: David C. Grant; Byron A. Lamson, both of Addison, Maine 04606

[22] Filed: Sept. 9, 1970

[21] Appl. No.: 70,789

[52] U.S. Cl. ........................................................56/330
[51] Int. Cl. ........................................................A01g 19/00
[58] Field of Search ..........................56/330, 328, 126, 130

[56] References Cited

UNITED STATES PATENTS

| 1,632,597 | 6/1927 | Hall | 56/330 |
| 2,694,284 | 11/1954 | Kortz | 56/328 R |
| 2,783,605 | 3/1957 | Heleen | 56/330 |
| 3,460,333 | 8/1969 | Buchele et al. | 56/330 |

Primary Examiner—Russell R. Kinsey
Attorney—Robert G. McMorrow

[57] ABSTRACT

A hollow rotating drum in the form of a plurality of circumferentially spaced rows of picking fingers extend tangentially with their free ends in the direction of drum movement at the forward end of the wheeled vehicle. An endless conveyor belt extends through the center of a fixed hollow collecting tube, parallel to the axis of finger rotation with radial guide members extending inwardly from each of the rows of picking fingers adjacent their fixed ends to discharge the picked berries, through an opening in the collecting tube onto the conveyor belt. The conveyor belt discharges the picked berries into a container located at one end of the collecting tube.

9 Claims, 4 Drawing Figures

3,675,406

PATENTED JUL 11 1972

INVENTORS
DAVID C. GRANT
BYRON A. LAMSON

BY *Robert G. McIlvaine*

ATTORNEY 3,675,406

INVENTORS
DAVID C. GRANT
BYRON A. LAMSON

BY *Robert J. McManow*

ATTORNEY

BERRY PICKING MACHINE

BACKGROUND OF THE INVENTION

1. Field of the Invention

This invention relates to motorized berry picking machines, and in particular to a wheeled vehicle carrying a rotating drum formed by moving rows of picking fingers tangential of the drum periphery for picking blueberries or the like from relatively low bushes.

2. Description of the Prior Art

Berries such as blueberries grow on relatively low bushes and have been picked by hand for many years due to lack of picking machines or the like capable of removing a great number of individual berries from the bushes. There have evolved in recent years, berry pickers of a mobile type which make use of a plurality of spaced fingers in rows or arrays carried by a rotating drum or the like whose free ends extend from the drum periphery in the direction of drum movement. In this case, the fingers pass over various limbs of the low growing berry bushes to comb the individual berries therefrom much in the same fashion as a comb moves through hair. One of the principal problems in employing rotating arrays of picking fingers, is the manner in which the berries are then removed from the fingers and boxed.

SUMMARY OF THE PRESENT INVENTION

The present invention is directed to the employment of a hollow continuously rotating drum defined at its periphery, by a plurality of circumferentially spaced rows of berry picking fingers extending transversely or laterally across the drum periphery such that the free ends of the individual fingers point in the direction of rotation of the drum. The drum is mounted for rotation at the forward end of a wheeled vehicle. Radial guide plates are fixed to the individual rows of picking fingers at their fixed or inner ends for directing the picked berries once captured by the radial guide plates, radially inward towards the hollow center of a fixed collecting tube. An endless conveyor belt extends the length of the fixed tube with the surface of the conveyor belt moving in a plane parallel to the axis of drum rotation thus discharging the accumulated berries through one hollow open end of the drum and tube into a container removably positioned for accumulating picked berries.

Preferably, the inner fixed tube carries an upper central opening to form a U-shaped chute which underlines the moving conveyor belt with the side walls extending above the plane of the moving belt. Downwardly and inwardly inclined guide plates direct the berries falling from the fingers onto the belt surface. The rotating drum is formed by laterally spaced, hollow discs with the row of longitudinally spaced picking fingers sandwiched between plates extending between the annular discs, and fixed to the periphery of respective discs at their ends. The discs each carry an annular sprocket, while, the wheeled vehicle carries a gasoline engine or the like which is coupled to the drum through the chains for continuously driving the same. The wheeled vehicle may constitute a supporting frame carried by laterally spaced wheels at the rear thereof for moving of the rotating drum and its gasoline powered engine, preferably in a direction at right angles to the axis of rotation to the drum. The two wheeled vehicle is steered by rearwardly extending handle means.

DESCRIPTION OF THE PREFERRED EMBODIMENT

Figure 4:
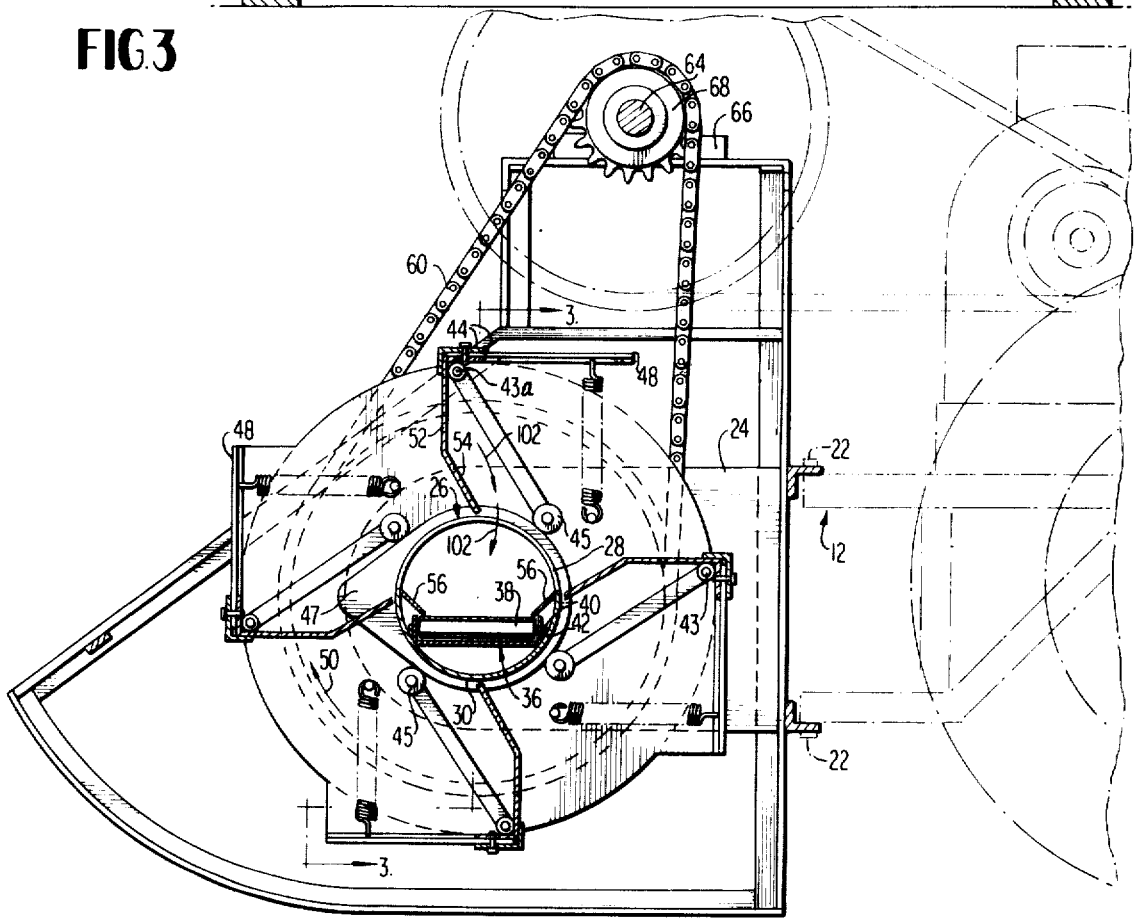
FIG. 4 is an elevational sectional view of a portion of the berry picker of FIG. 1 taken about lines 4—4.

Referring to the drawings, the berry picker 10 of the present invention comprises in general, a two wheeled vehicle including a frame assembly 12 supported by a pair of rubber tired wheels 14 on either side thereof, the wheels 14 being mounted for rotation about their axis. The wheeled picker 10 is, in this case, powered by the same motor that powers the drum, and the rearward extending handlebars 16 are used only for directing machine in direction of travel. Frame member 12 supports at the forward end of the vehicle, a picker frame assembly 18 comprising a vertical support plate 20 removably coupled to frame 12 by pairs of bolts 22. Plate 20 has extending therefrom, on either side, side plates 24 of relatively heavy gauge metal in spaced parallel fashion. Plates 24 are provided at their forward ends with aligned relatively large diameter openings within which is positioned a fixed cylindrical collecting tube 26. The tube 26 has a large central, portion removed or open at the top, as at 28, while the lower half of the drum 26 intermediate of the ends forms a U-shaped chute, 30, within which is positioned an endless conveyor belt 32. The endless conveyor belt 32 is supported for movement within a U-shaped frame 36 which in turn supports a plurality of longitudinally spaced rollers 38 whose ends 40 extend through aligned holes within the side walls 42 of the U-shaped member 36. The U-shaped frame member 36 is rigidly fixed to the inner periphery of chute 30. The cylindrical ends of the collecting tube 26 constitute bearing surfaces for a rotatable picker drum assembly 39 comprising a pair of spaced, apertured discs 41; 41' which carry axially extending flanges 43 which constitute the rotating bearing surfaces for drum assembly 39. The discs 41 are coupled at their outer periphery at four locations, by transversely extending plates or bars 44 which are bolted together by bolts 46 and act to sandwich therebetween a row of tangentially extending picker fingers 48 whose free ends extend in the direction of movement which is shown in FIG. 4 as being clockwise by arrow 50. With the fingers mounted in cantilever fashion by transversely extending bars 44, there is fixed to the mounting bars 44, radially extending guide plates 52 having bent portions 54 which terminate just short of the collecting tube 30. At the edges of the intermediate chute 30 of the fixed drum, a pair of fixed inclined guide plates 56 extend downwardly and inwardly such that, as the picker fingers rotate and remove the berries from the plants not shown, they move inwardly along the fingers 48, contact the radial guide plates or rails 52 and pass by gravity onto the moving conveyor belt 30.

Figure 3:
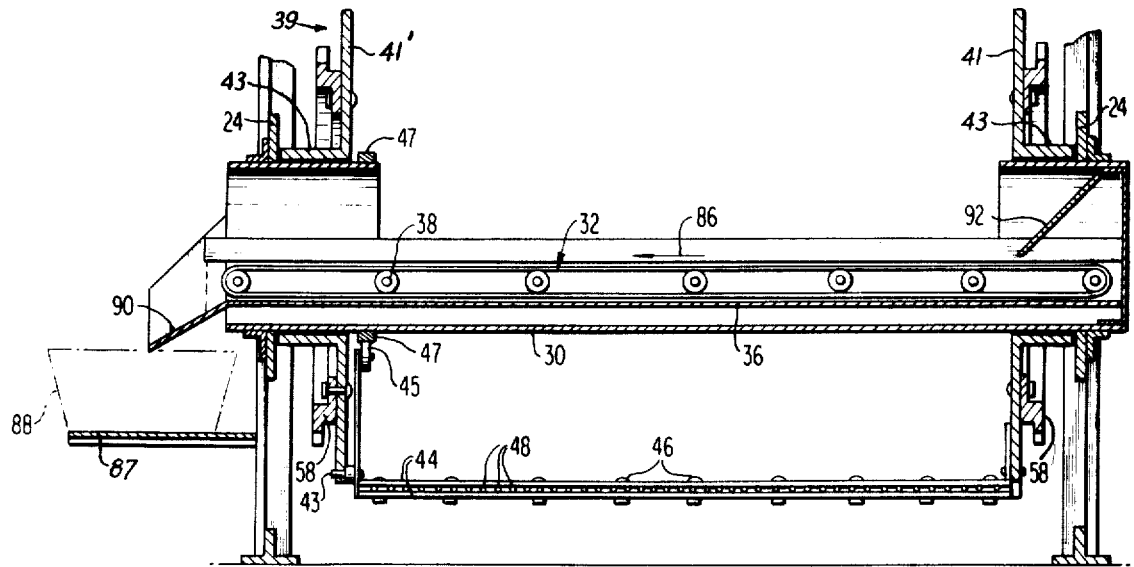
FIG. 3 is a front elevational view, in section taken about lines 3—3 of FIG. 4.

The rotating drum assembly 39 is further provided, FIG. 3, with sprocket wheels 58 each of which carries a conventional drive chain 60. The vertical support plate 20 further carries a rectangular upper frame assembly 62 upon which is mounted for rotation, a shaft 64 by bearing means 66, the shaft being coupled to small sprocket wheels 68 which each engage a chain 60. In turn, shaft 64 is coupled to a larger diameter pulley 70 which in turn, is coupled via belt 72 to the driving pulley 74 forming the output of the gasoline engine 76.

The frame assembly 12 for the vehicle then readily supports the engine 76 with the engine generally overlying the axis of wheels 14 of the vehicle.

In addition, shaft 64 is directly coupled to a rotating drive shaft 78 through bevel spur gears 80 and 82 carried respectively by shafts 64 and 78. The lower end of shaft 78 is coupled to one of the conveyor rollers 38 via spur gear assembly 84 in such a manner, that a given conveyor support and drive roller 38 is mechanically driven in a positive manner through a gear train emanating from shaft 64 which is driven by pulley 70. The endless conveyor belt 32 is in frictional contact with the outer periphery of driven roller 38 and thus, the endless conveyor belt is continuously driven in the direction of arrow 86, FIG. 3, to cause all of the berries which impinge upon the surface of the belt to move from right to left in this figure for discharge through the open end of the collecting tube 26. In this regard, the right hand frame member 24 supports horizontal shelf 87 upon which rests a removable container indicated in dotted lines at 88 which underlines the open end of an inclined chute extension 90 extending from fixed tube 26. Referring to FIG. 3, an inclined guide plate 92 extends downwardly at the right hand side of fixed tube 26 internally of the same to prevent accumulation of berries behind and below the endless conveyor belt on that side of the apparatus. Preferably, in the illustrated apparatus both rotating discs 41 carry annular sprockets 58 so that the rotating drum assembly 39 is driven from both sides thereof through a single pulley wheel 70 located intermediate of driving sprockets 68 on shaft 64.

In order to prevent contact between the rotating drum and the rather fragile picking fingers 48 and objects other than the bushes being stripped, a curved metal frame or scoop 94 extends outwardly and upwardly from the bottom end of vertical plate 20, the curved outer end 96 of this frame is fixed to frame assembly 62 by inclined, paired support bars 98.

The paired plates 44 are pivotably coupled to discs 41 at 43a and carry cam followers 45 which ride on rotatably adjustable cams 47. The cams 47 cause the fingers 48 to open and close, that is, rotate about the axis defined by pivot mounts 43a. The adjustment of this machine to pick various heights is accomplished by angular adjustment of the cams 47 that open and close the picking fingers.

Figure 1:
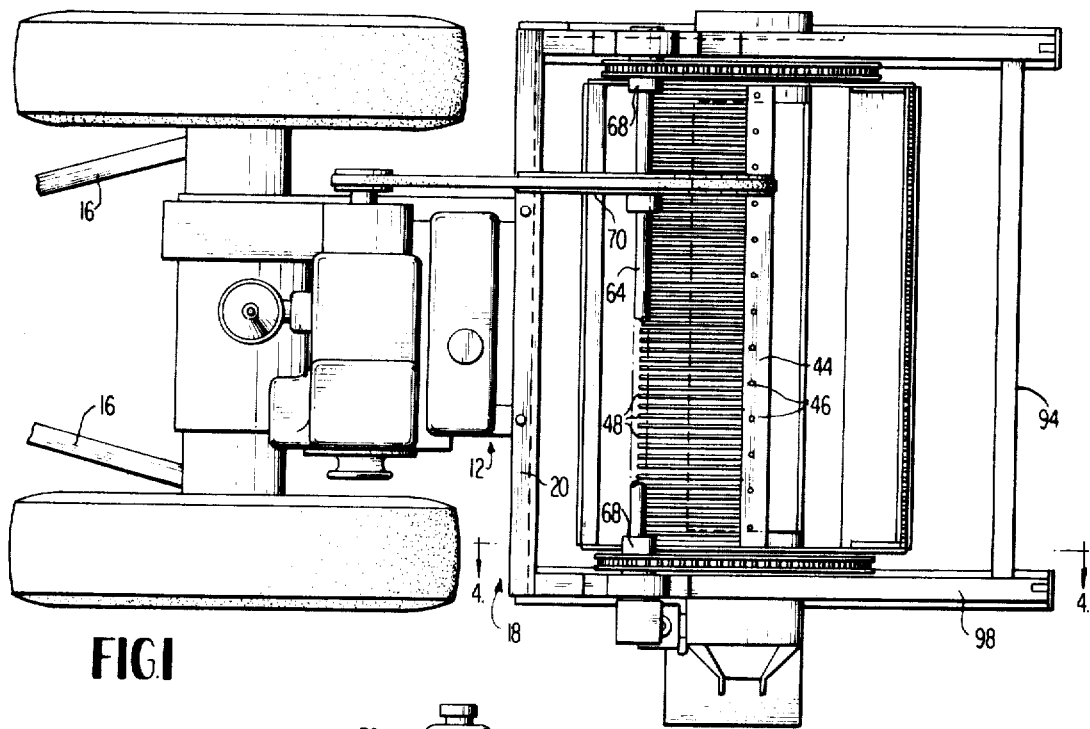
FIG. 1 is a top plan view of the wheeled berry picker of the present invention.
Figure 2:
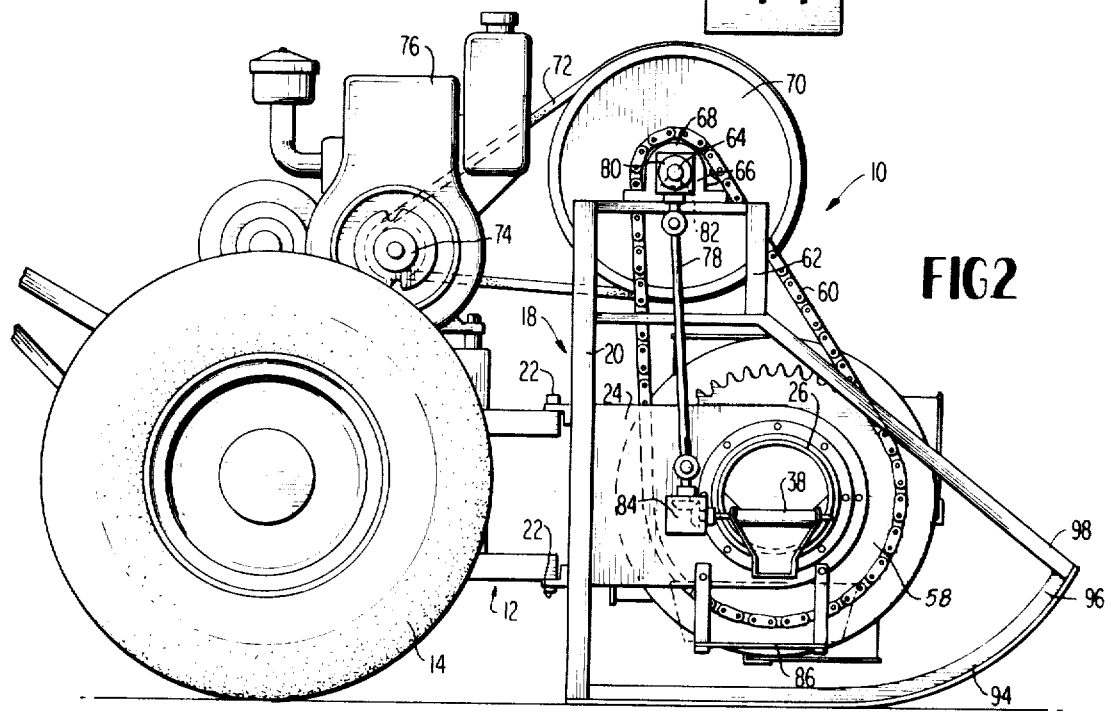
FIG. 2 is a right hand, side elevational view of the berry picker shown in FIG. 1.

The operation of the picker is evident from the above description; however, briefly upon starting of the gasoline engine 76, the continuous rotation of shaft 64 causes the picker drum 39 to rotate continuously as does end endless conveyor whereupon, any berries which are removed from the bushes (not shown) by the individual picker fingers 48 are directed by the radially inclined plates 52 towards the center of the rotating drum and necessarily fall onto the upper surface of the moving conveyor belt 32 in the manner of arrows 102, FIG. 2. The accumulated berries move from right to left as indicated in FIG. 3 falling off of the endless conveyor belt and onto the surface of guide chute 90 whereupon, they are directed by gravity into the open end of container 88. Once the container is filled, a new container such as a berry box may replace the same and thus a continuous usage of the berry picker results with the operator merely directing the direction of travel. This machine picks a 30-inch swath continuously in a forward motion. The only purpose of reversing this machine would be to change the direction of travel.

What is claimed is:

1. A berry picking machine comprising:
a wheeled vehicle;
means carried by said vehicle for supporting a collecting tube;
a longitudinally mounted collecting tube mounted on said means;
at least one row of longitudinally spaced picking fingers defining a longitudinally extending rotating drum, the fingers including free ends, and the free ends of the fingers extending in the direction of drum movement with said fingers defining a plane parallel to the axis of drum rotation;
radial guide means in said collecting tube for directing picked berries toward the axis of the collecting tube; and
conveyor means within said tube extending parallel to the axis of said rotating drum interiorly of said rotating fingers and said radial guide means for transporting picked berries to one end of said collecting tube.

2. The berry picking machine as claimed in claim 1 wherein said conveyor means comprises an endless conveyor belt.

3. The berry picking machine as claimed in claim 1 wherein said hollow, rotatable drum comprises laterally spaced, apertured discs and a plurality of circumferentially spaced, overlapping pairs of bars having individual laterally spaced fingers extending tangentially of the drum axis and between said bars with the ends of said bars being attached to respective discs in the vicinity of the disc periphery.

4. The berry picking machine as claimed in claim 2 further comprising a fixed, hollow collecting tube for concentrically supporting said rotatable drum for rotation thereabout, said fixed hollow drum having a longitudinally extending, recess within the upper portion thereof whereby, berries moving radially inwards along said radial guide members pass through said recess and onto said moving conveyor belt.

5. The berry picking machine as claimed in claim 4 further comprising sloped guide rails extending inwardly and downwardly from the edges of said recess on each side of said moving conveyor belt to insure movement of said berries from said fingers and said radial guide members onto the surface of said moving conveyor belt.

6. The berry picking machine as claimed in claim 5 wherein at least one of said rotatable discs forming said rotatable drum, carries an annular sprocket on one face thereof, a gasoline powered engine carried by said vehicle and means including a sprocket operatively coupled to said engine for rotation therewith, and an endless chain coupling respective sprockets for effecting continuous rotation to said rotatable drum.

7. The berry picking machine as claimed in claim 5 further comprising means for supporting a driving shaft for rotation parallel to the axis of said rotating drum and spaced radially therefrom, sprocket means carried by said rotating shaft and said rotatable drum an endless chain coupling respective sprocket means, and gear means coupling said rotatable shaft and said endless conveyor belt for positively driving the same in a direction to move accumulated berries on said conveyor belt to one end of said drum for discharge therefrom.

8. The berry picking machine as claimed in claim 7, wherein said conveyor belt extends through said complete length of said fixed collecting tube, and said vehicle further includes means for supporting a removable container beneath the open end of said conveyor belt for allowing gravity discharge of the accumulated berries into the same.

9. The machine as claimed in claim 3, further comprising: means for pivotably coupling the ends of said bars to said spaced discs, angularly adjustable cam means and cam follower means fixed to said bars and operatively contacting said cam means.

* * * * *